United States Patent [19]
Park

[11] Patent Number: 5,991,001
[45] Date of Patent: Nov. 23, 1999

[54] LIQUID CRYSTAL DISPLAY AND METHOD FOR MANUFACTURING THE SAME

[75] Inventor: Ho-young Park, Pusan, Rep. of Korea

[73] Assignee: Samsung Display Devices Co., Ltd., Kyungki-do, Rep. of Korea

[21] Appl. No.: 08/999,890

[22] Filed: Dec. 24, 1997

[30] Foreign Application Priority Data

Dec. 30, 1996 [KR] Rep. of Korea ....................... 96-76952

[51] Int. Cl.⁶ ......................... G02F 1/1337; G02F 1/141
[52] U.S. Cl. ............................ 349/191; 349/136; 349/124
[58] Field of Search ..................................... 349/124, 136, 349/191

[56] References Cited

U.S. PATENT DOCUMENTS

| | | | |
|---|---|---|---|
| 5,073,294 | 12/1991 | Shannon et al. | 359/76 |
| 5,464,669 | 11/1995 | Kang et al. | |
| 5,739,882 | 4/1998 | Shimizu et al. | 349/123 |
| 5,764,326 | 6/1998 | Hasegawa et al. | 349/124 |
| 5,817,743 | 10/1998 | Gibbons et al. | 350/341 |

*Primary Examiner*—William L. Sikes
*Assistant Examiner*—Joanne Kim
*Attorney, Agent, or Firm*—Leydig, Voit & Mayer, Ltd.

[57] ABSTRACT

A method for manufacturing a liquid crystal display and a liquid crystal display manufactured by the same are provided. The method comprises the steps of coating an orientation film on the respective opposing surfaces of first and second transparent substrates, orientation-processing the orientation films by rubbing said orientation film, injecting and sealing liquid crystal between the orientation films, and irradiating an ultraviolet ray having an energy of 200 J/cm² or less on a liquid crystal cell to which the liquid crystal has been injected.

6 Claims, 1 Drawing Sheet

LIQUID CRYSTAL DISPLAY AND METHOD FOR MANUFACTURING THE SAME

BACKGROUND OF THE INVENTION

1. Field of the Invention

The present invention relates to a liquid crystal display and a method for manufacturing the same, and more particularly, to method for manufacturing a liquid crystal display which includes a process of forming an orientation film for aligning liquid crystal and a process of treating the liquid crystal, and a liquid crystal display manufactured by the method.

2. Description of Related Art

A general liquid crystal display can be produced in various sizes ranging from a subminiature size to a large size, and diverse display patterns can be achieved. Liquid crystal displays have been widely applied to display devices. FIG. 1 shows an example of a liquid crystal display having a liquid crystal having a twist angle between 90° and 270°. As shown in FIG. 1, first and second transparent electrodes 13 and 14 are isolated from each other in parallel stripes and intersect each other. The first and second electrodes 13 and 14 are formed on the opposing surfaces of first and second transparent substrates 11 and 12, respectively. Orientation films 16 and 17 are formed on the transparent electrodes 13 and 14, respectively. Liquid crystal 19 is injected between the orientation films 16 and 17, and the resultant structure is sealed by a sealant 18. Polarizing plates 21 and 22 are attached on the outer surfaces of the first and second transparent substrates 11 and 12, respectively, and the light polarization directions of the polarizing plates 21 and 22 correspond to the twist angle of the liquid crystal 19.

The surfaces of the orientation films 16 and 17 are treated to orient the liquid crystal 19 in a predetermined direction. Here, treatment of the orientation films is an important factor in determining the pretilt angle of the orientation films. Preferably, the pretilt angle is large for effective picture display.

Examples of typical orientation film treatment methods include a rubbing method for rubbing the orientation films 16 and 17 in a predetermined direction using a cloth, a non-rubbing method including an SiO incline deposition method, a figure transcription method and a light irradiation method using high-polymerization of light due to ultraviolet radiation. The rubbing method causes phase distortion and light dispersion since it is difficult to form fine and accurate orientation grooves on the orientation film. In particular, since the pretilt angle of the orientation film depends on the rubbing pressure, the rubbing pressure must be increased to obtain a large pretilt angle, and it is also difficult to obtain a uniform pretilt angle over the entire orientation film.

The light irradiation method, as an orientation treatment method performed by exposure to light and development of a photosensitive film coated on the upper surface of the orientation film, can arbitrarily control the direction of orientation. However, in this type of non-rubbing method, there is a limit in improving the resolution of the picture since the orienting force is weak and the pretilt angle is not relatively large.

For example, a pretilt angle of 4 to 6° is obtained by orienting polyimide (a high polymer compound) using the non-rubbing method. This pretilt angle is not within the normally acceptable range between 8° and 10°. Therefore, a reversely twisted domain where liquid crystal molecules are reversely twisted may be generated.

In order to solve the above problem, as disclosed in U.S. Pat. No. 5,464,669 issued to Kang et al. on Nov. 7, 1995, a method for forming a polyvinyl-4-fluorocinnamate (PVCN-F) film respectively on two opposing substrates and irradiating linearly-polarized UV rays having different energies on the respective PVCN-F films has been developed.

However, the PVCN-F polymer is relatively expensive, and since the pretilt angle depends on the difference in energies of linearly polarized light, it is difficult to control the amount of irradiation of light.

SUMMARY OF THE INVENTION

To solve the above-described problem, it is an object of the present invention to provide a method for manufacturing a liquid crystal display by which the pretilt angle of an orientation film can be increased, and a liquid crystal display manufactured by the above manufacturing method.

To accomplish the above object, there is provided a method for manufacturing a liquid crystal display, comprising the steps of coating an orientation film on the respective opposing surfaces first and second transparent substrates, orientation-processing the orientation films by rubbing the orientation film, injecting and sealing liquid crystal between the orientation films to form a liquid crystal cell, and irradiating the liquid ultraviolet liquid crystal cell with radiation having an energy of 200 J/cm$^2$ or less.

Here, it is preferable that the energy of the ultraviolet radiation is between 10 J/cm$^2$ and 100 J/cm$^2$.

Also, the method can further comprise the step of heating the liquid crystal cell to a predetermined temperature.

According to another aspect of the present invention, a liquid crystal display manufactured by the above method is provided.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
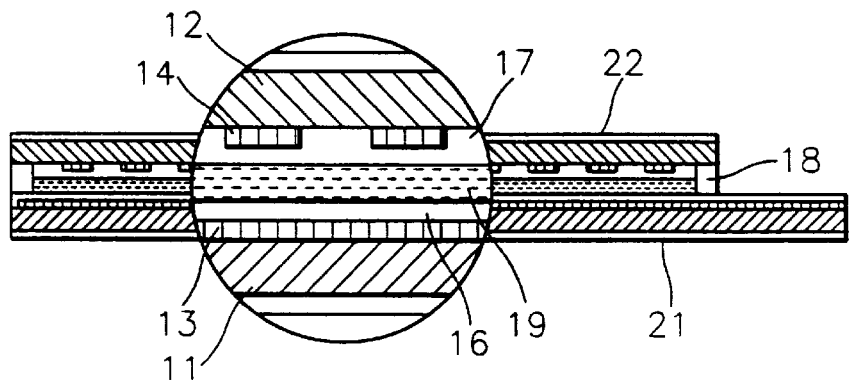
FIG. 1 is a sectional view of a general liquid crystal display in which a portion thereof has been magnified.

A liquid crystal display manufacturing method according to the present invention will be described referring to FIG. 1 showing the configuration of a typical liquid crystal display.

First and second transparent electrodes 13 and 14 each having a predetermined pattern are formed on the opposing surfaces of first and second transparent substrates 11 and 12 which have been thoroughly cleaned. Orientation films 16 and 17 coated opposing surfaces of the first and second transparent substrates 11 and 12 on which the transparent electrodes 13 and 14 are formed, using a polyimide having a long-chain alkyl group. A typical well-known material can be used as the polyimide. The thickness of the orientation film is between 300 Å and 1000 Å, preferably, between 350 Å and 700 Å. Also, the orientation films 16 and 17 are orientation-treated by a rubbing method using a cloth.

After the orientation films 16 and 17 are completely formed, liquid crystal 19 is injected between the orientation films 16 and 17, and the resultant structure is sealed at the edges by a sealant 18.

Then, a process for increasing the pretilt angle is performed as follows. That is, the liquid crystal cell into which liquid crystal has been injected is heated to a predetermined temperature. Here, it is preferable that the heating temperature is between 90° C. and 180° C., with the optimal temperature being between 100° C. and 120° C. When the temperature is lower than 90° C., irradiation with, e.g., the liquid crystal cell with ultraviolet radiation (to be described later) does not have a significant effect in increasing the pretilt angle. When the temperature is greater than 180° C., the liquid crystal may be damaged.

Thereafter, the heated liquid crystal cell is irradiated with ultraviolet rays. Here, the ultraviolet rays have energy of less than 200 $J/cm^2$, preferably, between 10 $J/cm^2$ and 100 $J/cm^2$. If the energy of the ultraviolet radiation is greater than 200 $J/cm^2$, the arrangement of liquid crystal is destroyed changing the characteristics of the liquid crystal. The liquid crystal cell is irradiated with ultraviolet radiation having a wavelength between 200 nm and 500 nm for 15 to 30 minutes. The optimal wavelength of the ultraviolet radiation, the pretilt angle is between 300 nm and 440 nm.

According to the present invention, the liquid crystal cell can be heated and irradiated simultaneously.

The effects of the present invention can be more clearly illustrated through the following experimental example.

EXPERIMENTAL EXAMPLE

In this experiment, PVC1 from Aldrich Chemical Co. was used as the material for the orientation film, the thickness of the orientation film was about 400 Å, and K33/K11:1.69 (indicated as reference character A) and K33/K11:1.57 (indicated as reference character B) were used as the liquid crystal.

Figure 2:
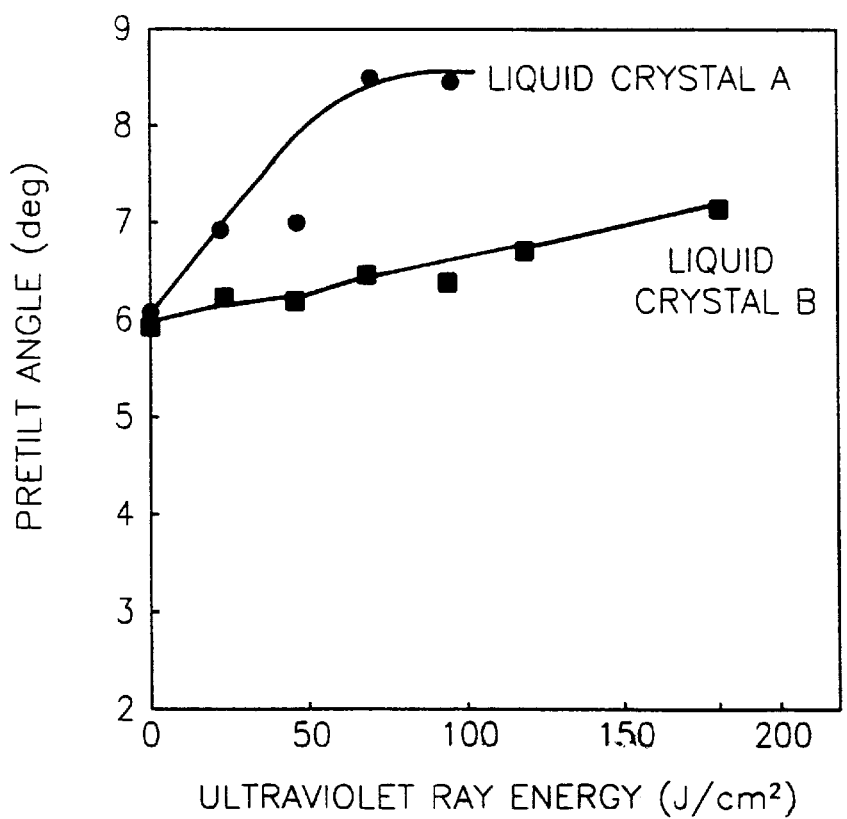
FIG. 2 is a graph showing variations in the pretilt angle according to the energy of an ultraviolet ray which is irradiated on an orientation film, according to the present invention.

FIG. 2 is a graph showing variations in the pretilt angle according to the energy of ultraviolet rays irradiating the liquid crystal cell.

As can be seen from the graph, in the case of the liquid crystal A, the pretilt angle increases significantly when ultraviolet light having an energy ranging between 10 $J/cm^2$ and 90 $J/cm^2$ is irradiated thereon. In the case of liquid crystal B, the pretilt angle increases in the range between 0 $J/cm^2$ and 200 $J/cm^2$ proportionally to an increase of the ultraviolet energy.

According to the present invention, the pretilt angle can be uniformly formed over the entire orientation film by controlling the pretilt angle of liquid crystal according to the amount of irradiation of an ultraviolet ray. Also, the formation of a reversely twisting domain described above can be prevented.

The present invention was described referring to the above embodiment, but it is only an example, and it will be understood by those skilled in the art that various modifications and other equivalent embodiments may be effected. Accordingly, the true technical scope of the present invention should be determined by the technical spirit of the following claims.

What is claimed is:

1. A method for manufacturing a liquid crystal display, said method comprising:

(a) coating each of respective opposing surfaces of first and second transparent substrates with an orientation film;

(b) orientation-processing said orientation films by rubbing said orientation films;

(c) injecting and sealing a liquid crystal material between said orientation films to produce a liquid crystal cell, the liquid crystal material being oriented to a first pre-tilt angle by said orientation films; and (d) irradiating said liquid crystal cell with ultraviolet radiation having an energy not exceeding 200 $J/cm^2$ for a period of 15 to 30 minutes to produce a second pre-tilt angle, larger than the first pre-tilt angle, of said liquid crystal material.

2. The method for manufacturing a liquid crystal display as claimed in claim 1, wherein the energy of the ultraviolet radiation is between about 10 $J/cm^2$ and about 100 $J/cm^2$.

3. The method for manufacturing a liquid crystal display as claimed in claim 1, wherein said orientation film comprises a polyimide having an alkyl side chain .

4. The method for manufacturing a liquid crystal display as claimed in claim 1, wherein the orientation film has a thickness between about 350 Å and about 700 Å.

5. The method for manufacturing a liquid crystal display as claimed in claim 1, comprising heating said liquid crystal cell to a temperature between 90° C. and 180° C.

6. The method for manufacturing a liquid crystal display as claimed in claim 5, wherein heating and irradiating of said liquid crystal cell are performed simultaneously.

\* \* \* \* \*